(12) United States Patent
Jomon et al.

(10) Patent No.: US 12,155,898 B2
(45) Date of Patent: Nov. 26, 2024

(54) METHODS AND SYSTEMS FACILITATING ADJUSTMENT OF MULTIPLE VARIABLES VIA A CONTENT GUIDANCE APPLICATION

(71) Applicant: Adeia Guides Inc., San Jose, CA (US)

(72) Inventors: Riya Jomon, Bangalore (IN); Susanto Sen, Karnataka (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/104,361

(22) Filed: Feb. 1, 2023

(65) Prior Publication Data

US 2023/0254542 A1     Aug. 10, 2023

Related U.S. Application Data

(63) Continuation of application No. 17/674,263, filed on Feb. 17, 2022, now Pat. No. 11,595,726, which is a continuation of application No. 16/899,105, filed on Jun. 11, 2020, now Pat. No. 11,284,157.

(51) Int. Cl.
| | |
|---|---|
| H04N 21/475 | (2011.01) |
| G06F 3/04847 | (2022.01) |
| G06F 3/04883 | (2022.01) |
| H04N 21/466 | (2011.01) |

(52) U.S. Cl.
CPC ..... *H04N 21/4755* (2013.01); *G06F 3/04847* (2013.01); *G06F 3/04883* (2013.01); *H04N 21/4668* (2013.01)

(58) Field of Classification Search
CPC ............ G06F 3/04847; G06F 3/04883; H04N 21/4755; H04N 21/4668
See application file for complete search history.

(56) References Cited

U.S. PATENT DOCUMENTS

| | | | |
|---|---|---|---|
| 9,851,842 B1* | 12/2017 | Sen | G06F 3/04883 |
| 11,595,726 B2 | 2/2023 | Jomon et al. | |
| 2013/0021488 A1* | 1/2013 | Plowman | H04N 19/54 |
| | | | 348/222.1 |
| 2013/0086519 A1* | 4/2013 | Fino | G06F 16/638 |
| | | | 715/810 |
| 2013/0138684 A1 | 5/2013 | Kim et al. | |
| 2013/0247078 A1 | 9/2013 | Nikankin et al. | |

(Continued)

FOREIGN PATENT DOCUMENTS

EP            3062206 A1     8/2016

*Primary Examiner* — Seth A Silverman
(74) *Attorney, Agent, or Firm* — HALEY GUILIANO LLP

(57) ABSTRACT

Systems and methods are described for facilitating adjustment of multiple variables via a content guidance application. The method comprises generating, for display via a graphical user interface of a touchscreen, a first axis defining a first scale for a first adjustment characteristic. The method further comprises assigning to the first adjustment characteristic a plurality of first variables stored in memory. The method further comprises detecting, via the touchscreen, a touch input having a component along the first axis for adjusting the first adjustment characteristic. The method further comprises, in response to detecting the touch input, adjusting, in the memory, each of the plurality of first variables assigned to the first adjustment characteristic based on the touch input and the first scale.

20 Claims, 7 Drawing Sheets

(56) References Cited

U.S. PATENT DOCUMENTS

| | | | |
|---|---|---|---|
| 2014/0085181 A1* | 3/2014 | Roseway | G06F 3/002 345/156 |
| 2016/0110442 A1* | 4/2016 | Williams | G06F 16/9038 707/737 |
| 2017/0245340 A1 | 8/2017 | Chen et al. | |
| 2021/0392405 A1 | 12/2021 | Jomon et al. | |
| 2022/0368992 A1 | 11/2022 | Jomon et al. | |

* cited by examiner

METHODS AND SYSTEMS FACILITATING ADJUSTMENT OF MULTIPLE VARIABLES VIA A CONTENT GUIDANCE APPLICATION

CROSS-REFERENCE TO RELATED APPLICATION

This application is a continuation of U.S. patent application Ser. No. 17/674,263, filed Feb. 27, 2022, which is a continuation of U.S. patent application Ser. No. 16/899,105, filed Jun. 11, 2020, now U.S. Pat. No. 11,284,157, the disclosures of which are hereby incorporated by reference herein in their entireties.

BACKGROUND

The present disclosure relates to facilitating adjustment of multiple variables via a content guidance application, and in particular, but not exclusively, relates to simultaneously adjusting multiple variables for retrieving a recommendation for media content.

SUMMARY

As the amount of content available to users for consumption continues to increase, it becomes more difficult for a user to search for content of interest. For example, a user may wish to search for content based on more than one search parameter, such as rating, genre, actor, release date, etc. A conventional content guidance application may allow a user to search for content based on a keyword, e.g., an actor's name, or even to sort a set of results using one or more filters. However, such approaches may become increasingly cumbersome to implement given the large number of variables a user may wish to quickly adjust in order to narrow search results.

Additionally, with an increasing amount of available content, it becomes more difficult for a system to automatically provide relevant recommendations to a user. For example, a conventional recommendation system may provide recommendations to a user based on their media consumption history, search history, or user profile, for example. However, a user's interest may vary depending on their mood, time of day, or if they are accompanied by another person, such as a child. In such cases, conventional systems may fail to identify the current interest and intent of the user while providing recommendations.

Furthermore, the number of settings that a user can adjust on user equipment via a media guidance application, such as audio and display settings, typically requires a user to scroll back and forth through a series of menus to obtain the desired overall setting. Thus, it is desirable to allow the user to set up quick access to simultaneously adjust multiple settings, e.g., both the volume of an audio system and the brightness of a display or lighting system, with a single user input.

Systems and methods are provided herein for facilitating adjustment of multiple variables, for example via a content guidance application.

According to the systems and methods provided herein, a first axis, e.g., an x-axis, is generated on a graphical user interface (GUI), the first axis defining a first scale for a first adjustment characteristic. A plurality of first variables stored in memory are assigned to the first adjustment characteristic. Each of the variables may be a quantitative variable, such as duration of a content item, or a qualitative variable, such as a preferred artist. An input, e.g., comprising at least one of a touch input and a gesture input, is detected having a component along the first axis for adjusting the first adjustment characteristic. In response to detecting the input, each of the plurality of the first variables assigned to the first adjustment characteristic are adjusted, e.g., simultaneously, based on the input and the first scale.

In some embodiments, a second axis, e.g., a y-axis, is generated on the graphical user interface, the second axis defining a second scale for a second adjustment characteristic. At least one second variable stored in the memory is assigned to the second adjustment characteristic. The detected input may have a component along the second axis for adjusting the second adjustment characteristic. In response to detecting the input, each of the one or more second variables assigned to the second adjustment characteristic is adjusted, e.g., simultaneously, based on the input and the second scale, e.g., in addition to each of the plurality of first variables assigned to the first adjustment characteristic.

In some embodiments, at least one of the first variables assigned to the first adjustment characteristic is a quantitative variable. In some embodiments, at least one of the first variables assigned to the first adjustment characteristic is a qualitative variable. In some embodiments, each, or all, of the first variables assigned to the first adjustment characteristic is a quantitative variable. In some embodiments, each, or all, of the first variables assigned to the first adjustment characteristic is a qualitative variable.

In some embodiments, at least one of the second variables assigned to the second adjustment characteristic is a quantitative variable. In some embodiments, at least one of the second variables assigned to the second adjustment characteristic is a qualitative variable. In some embodiments, each, or all, of the second variables assigned to the second adjustment characteristic is a quantitative variable. In some embodiments, each, or all, of the second variables assigned to the second adjustment characteristic is a qualitative variable.

In some embodiments, one of the first variables assigned to the first adjustment characteristic is the same as one of the second variables assigned to the second adjustment characteristic, e.g., each of the first adjustment characteristic and the second adjustment characteristic may be assigned the variable "content duration". In some embodiments, the second scale for the second adjustment characteristic may have a higher resolution than the first scale for the first adjustment characteristic. For example, the resolution of the variable "content duration" assigned to the first adjustment characteristic may have a resolution of minutes, and the resolution of the variable "content duration" assigned to the second adjustment characteristic may have a resolution of seconds.

In some embodiments, the assignment of a first variable to the first adjustment characteristic may determine, or influence, the assignment of a second variable to the first adjustment characteristic. For example, where a quantitative variable is assigned as the first variable, the assignment of the second variable may be limited to another quantitative variable. In this manner, the assignment of variables to the first adjustment characteristic may exhibit dependency on one another. In an example where a second axis is generated, the assignment of one or more variables to the first adjustment characteristic may determine, or influence, the assignment of one or more variables to the second adjustment characteristic. In one example, a variable assigned to the second adjustment characteristic may be a subset of a variable assigned to the first adjustment characteristic. In some embodiments, variables may be assigned automatically to the second adjustment characteristic based on the assignment of at least one of the plurality of variables to the first adjustment characteristic. In some embodiments, variables may be assigned automatically to at least one of the first and second adjustment characteristics based one or more preferences stored in a user profile.

In some embodiments, a set of content items, e.g., stored in a content database, may be accessed. In some embodiments, one or more content items may be selected from the set of content items based on the first adjustment characteristic. In some embodiments, an indicator of the selected one or more content items is generated for display to a user. The indicator may comprise a link to access the one or more content items, e.g., for immediate consumption or for recording. In some embodiments, one or more variables assigned to the first adjustment characteristic may be updated, e.g., automatically, based on the selected one or more content items.

In some embodiments, at least one of the first adjustment characteristic and the second adjustment characteristic may be set to a minimum threshold based on detecting the user input, e.g., a first point of contact of a user input to a touchscreen display. For example, where the variable "content duration" is assigned to an adjustment characteristic, the value of the variable "content duration" may be set to zero upon first detection of the user input.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
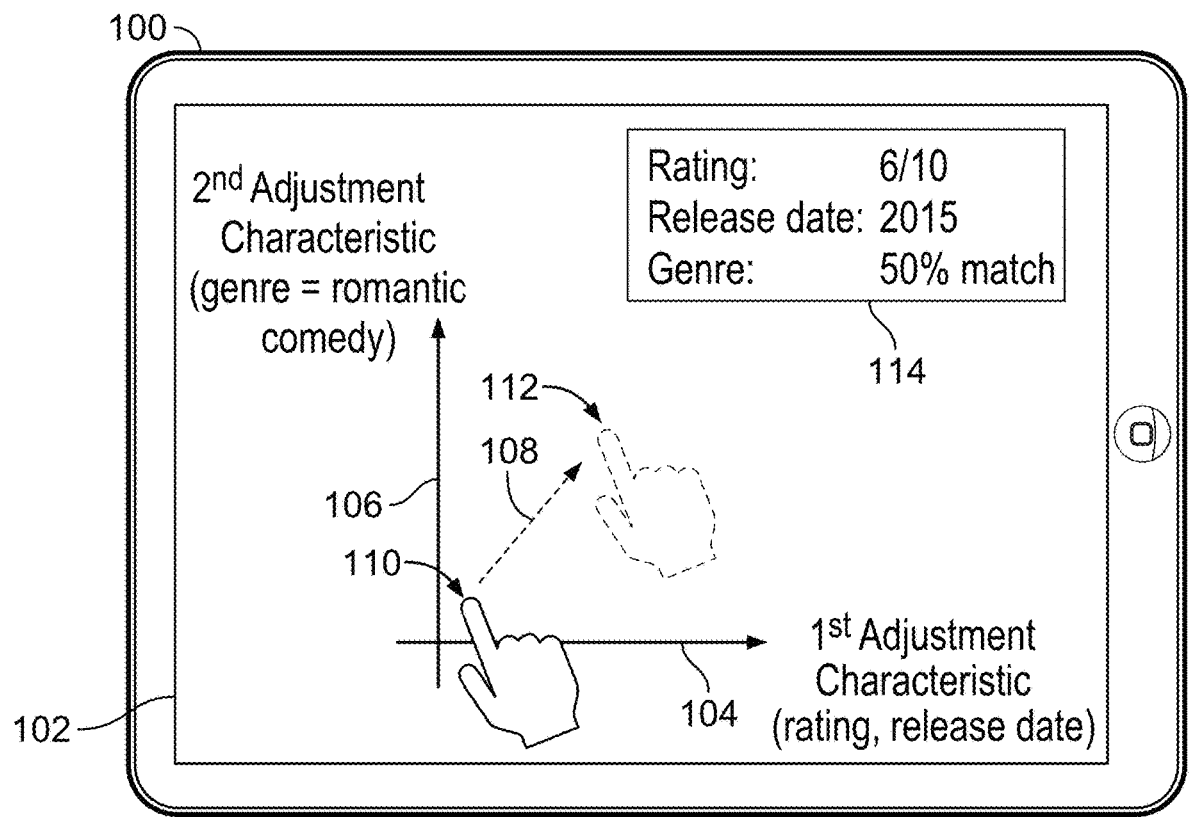
FIGS. 1A and 1B illustrate an exemplary system and method for facilitating adjustment of multiple variables via a content guidance application, in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive content guidance application or, sometimes, a content guidance application, a media guidance application, or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 1B:
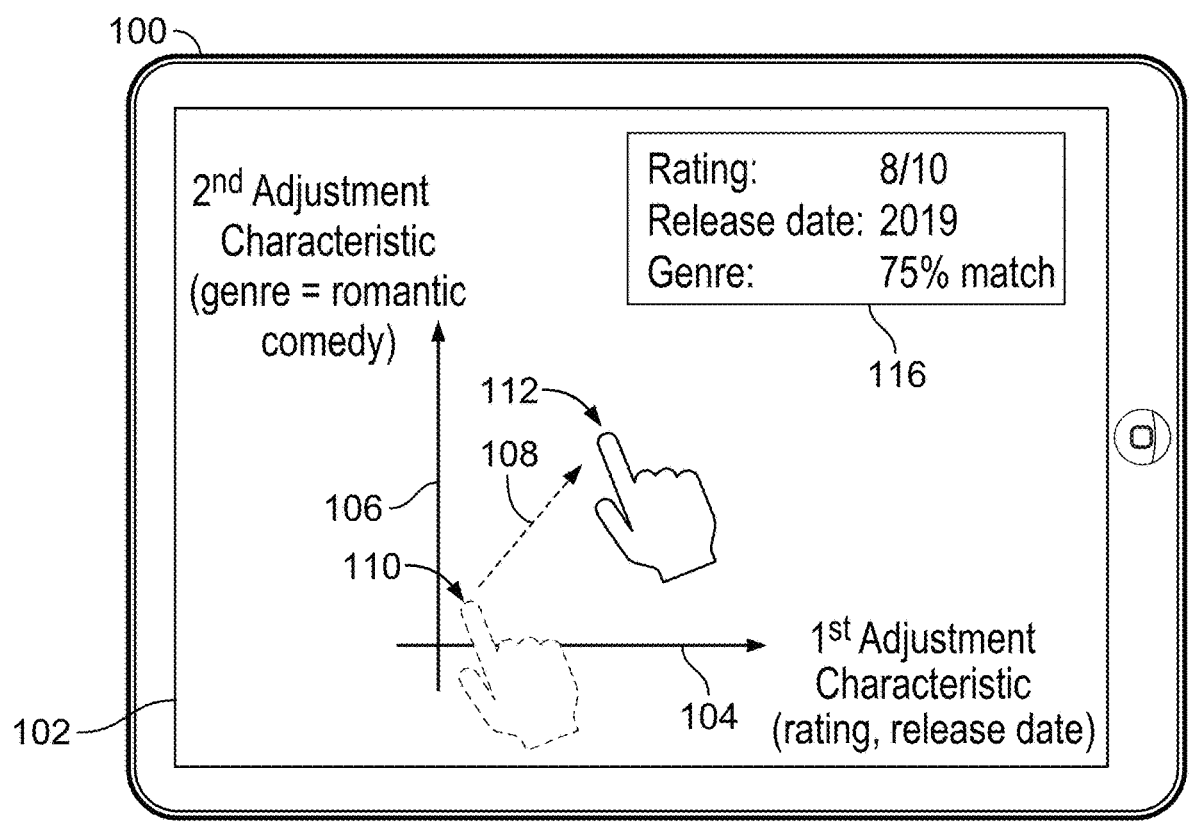

FIGS. 1A and 1B show an exemplary user device 100 having a touchscreen 102 for facilitating adjustment of multiple variables via, e.g., using a content guidance application. In the example shown in FIGS. 1A and 1B, the user device 100 is configured to generate, for display via a graphical user interface of the touchscreen 102, a first axis 104 defining a first scale for a first adjustment characteristic, and a second axis 106 defining a second scale for a second adjustment characteristic. In some examples, the first and second axes may be arranged on axes (e.g., +x, −x, +y, −y) of a Cartesian coordinate plane. However, the axes may be arranged in any appropriate manner. The scale of each of the axes may be set according to one or more variables that are assigned to the respective adjustment characteristics. For example, the scale of each axis may be a numerical scale, e.g., a scale from 0 to 10; an alphabetical scale; e.g., a scale from A to Z; or a scale that correlates to one or more parameters defined in a user profile, e.g., a preference for or against certain genres of content.

In the context of the present application, the term "adjustment characteristic" refers to a variable or set of variables that a user may wish to change in order to characterize a particular user intent, e.g., when searching for recommended media content, or when controlling the operation of one or more user equipment devices. For example, one adjustment characteristic may define a set of variables that set search criteria (rating, actor, release date, etc.) when searching for media content. Another adjustment characteristic may define a set of variables that control the overall audio-visual settings of user equipment, such as a TV. Another adjustment characteristic may define a set of variables that control respective variables used in the operation of different user equipment devices, e.g., that are connected via a (home) network. The variable or variables may be stored on memory of the user device 100, or on a remote memory with which the user device 100 is communicable.

In the context of performing a search for media content, a variable may include, but not be limited to, any of genre, sub-genre, cast, actors, director, producer, studio, cinematography, music, sound, score, release date, a rating, comments (content and/or number of), reviews (content and/or number of), story detail, plotline, script, screenplay, dialogue, set, filming location, language, subtitles, performance artist, instrument, instrument predominance, or any other appropriate variable as will be understood by those of skill in the art. A variable may include a group of at least one of the above-listed variables, such as a group of genres, a group of actors, or a group (or range) of release dates, among others.

In the context of controlling user equipment, a variable may include, but not be limited to, any of a display setting, such as brightness, color, color balance, sharpness, contrast, or gamma correction, etc.; an audio setting, such as volume, balance, bass, treble, etc.; a lighting setting, such as the brightness, tone, shade, etc., a climate setting, such as temperature, humidity, etc., a navigational setting, such as route, estimated time, distance, traffic, route quality, e.g., how scenic a route is, how urban a route is, road characteristics along a route, etc.; or any other appropriate variable as will be understood by those of skill in the art. A variable may include a group of at least one of the above-listed variables, such as a setting for a group of displays, and/or a setting for a group of lights in a lighting system, among others.

In one example, a user may select one or more variables to assign to an adjustment characteristic. For example, the content guidance application may be configured to display one or more menus on the touchscreen 102 from which a user may select a variable or variables to assign to one or more of the adjustment characteristics. In the example shown in FIGS. 1A and 1B, the user's intent is to search for recommended content from a set of content items based on a set of user-defined variables, e.g., the release date of the content, the rating of the content, and the genre of the content, since the user is interested, e.g., at a certain time, in watching only newer and more highly rated movies of a certain genre. In this case, the user has assigned the variables "release date" and "rating" to the first adjustment characteristic on the first axis 104, and has assigned the variable "romantic comedy" to the second adjustment characteristic on the second axis 106. The scale of each of the axes may be determined automatically depending on the chosen variable, e.g., may be set to default values, such as a scale from a minimum value to a maximum value, or may be defined by the user. For example, since the user in this example has chosen to assign two variables that are defined numerically to the first adjustment characteristic, the scale of the first axis may be set such that the origin of the first axis (x=0) corresponds to a lower numerical value that increases along the axis (x+). In this manner, a point towards the origin of the first axis (x=0) may represent a content item having a lower rating and an earlier release date, whereas a point away from the origin of the first axis (x+) may represent a content item having a higher rating and a later release date.

In one example, the user may set a desired range for one or more of the variables. For example, the content guidance application may be configured to provide an option for the user to adjust the range of a selected variable, e.g., the user may receive a prompt to adjust the range of a selected variable just after the user has selected the variable. In the example shown in FIGS. 1A and 1B, the user may set the range of the rating to a subset of the total range, e.g., to a rating of 5 to 10 out of 10, or to a rating of 3 stars or above. In a similar manner, the user may set the range of the release dates to a desired range of dates. For example, the user may wish to consider watching only content from the last 5 years, and may wish to discount any earlier released content items from the search.

In another example, the scale may be set based on data stored in a user profile, which may be automatically updated and/or manually updated by the user. For example, a user profile may be stored in memory that is accessed whenever the user assigns a variable to an adjustment characteristic. The user profile may store one or more user preferences relating to one or more variables, e.g., a preference for content items having a certain actor or group of actors. For example, the user profile may store preferences for rating and release date, so that the user need not set the desired range each time they assign a variable to an adjustment characteristic.

Turning to the second adjustment characteristic, the user has set the variable as the genre of content relating to "romantic comedy". In this case, the scale of the second axis may be determined by how closely a content item matches the chosen genre. For example, the user device 100 may have access to a database storing metadata relating to a set of content items. The metadata may contain information relating to the genre of the content item, amongst other information as will be understood by those of skill in the art, such as rating or release date, or any of the other variables defined above. A matching algorithm may rank the content items depending on how well each of the content items matches the assigned variable. For example, a movie such as "The Philadelphia Story" may rank highly as a match, e.g., a 95% match, to the genre "romantic comedy", whereas the movie "Predator" may rank lower as a match, e.g., a 5% match, to the genre "romantic comedy", e.g., based on metadata stored in memory and/or other metadata accessible to the user device 100. In a similar manner to the variables assigned to the first adjustment characteristic, the user may set a desired range for one or more of the variables assigned to the second adjustment characteristic. For example, the user may wish to only search within a subset of the content items that have a match above a certain percentage, e.g., 75%, to the selected genre. In this manner, a point towards the origin of the second axis (y=0) may represent a content item having a lower-ranked match to the assigned genre of "romantic comedy", whereas a point away from the origin of the second axis (y+) may represent a content item having a higher ranked match to the assigned genre of "romantic comedy".

In another example, the user may have assigned the broader variable "genre" to the second adjustment characteristic. In such a case, the set of content items may be grouped by genre and ordered alphabetically, such that a point towards the origin of the second axis (y=0) may represent a content item belonging to a genre beginning with "A", e.g., "Action", whereas a point away from the origin of the second axis (y+) may represent a content item belonging to a genre beginning with "S", e.g., "science fiction".

In another example, a broader variable, such as "genre", or any other appropriate qualitative variable, may be ranked based on the user's profile. For example, the user's profile may indicate that the user has a preference for the genres "crime" and "thriller", and a preference against the genres "fantasy" and "kids". In such a case, the set of content items may be grouped by genre and ordered by correlation to the user's preferences, such that a point towards the origin of the second axis (y=0) may represent a content item having a lower correlation to the genres "crime" and "thriller" and a higher correlation to the genres "fantasy" and "kids", whereas a point away from the origin of the second axis (y+) may represent a content item having a higher correlation to the genres "crime" and "thriller" and a lower correlation to the genres "fantasy" and "kids".

Returning to the example where the user has assigned the variables "release date" and "rating" to the first adjustment characteristic and the variable "romantic comedy" to the second adjustment characteristic, the user device 100 is configured to detect, via the touchscreen 102, a touch input 108 having a component along the first axis 104 for adjusting the first adjustment characteristic and a component along the second axis 106 for adjusting the second adjustment characteristic. In the example shown in FIGS. 1A and 1B, the touch input 108 starts at a first point 110 towards the origin of the axes (x=0, y=0) and moves diagonally away from the origin towards a second point 112. However, the touch input 108 may be any input having a component along at least one of the first and second axes 104, 106. Further the touch input 108 is not limited to movement between the first and second points 110, 112 shown in FIGS. 1A and 1B. For example, the touch input 108 may comprise any number of separate or continuous, straight or curved movements having a component along at least one of the first and second axes.

In response to detecting the touch input 108 having a component along the first axis (x-direction), the user device 100 causes the adjustment of, in the memory, each of the variables ("rating" and "release date") assigned to the first adjustment characteristic based on the touch input 108 and the first scale. In response to detecting the touch input 108 having a component along the second axis, the user device 100 causes the adjustment of, in the memory, the variable ("romantic comedy") assigned to the second adjustment characteristic based on the touch input 108 and the second scale. In this manner, the user is able to adjust a plurality of variables using a single touch input. Importantly, the user is able to adjust a plurality of variables even where the touch input comprises a component along (only) one axis, e.g., the first axis 104.

In the context of searching for recommended content items, the benefit of adjusting a plurality of variables at once is that relevant content items may be identified to the user in a more efficient manner, since compound search criteria may be adjusted using a single user input. For example, using the example shown in FIGS. 1A and 1B, the user is able to quickly set each of the variables for "rating", "release date" and "romantic comedy" to a desired value, e.g., a rating of 6 out of 10 (or above), a release date of after a particular date, and content items having a match to the genre "romantic comedy" equal to or above a desired ranking, such as a 75% match.

In one example, the user device 100 may be configured to display, e.g., in real time, how the assigned variables are adjusted depending on the position of the user's touch input 108 on the touchscreen 102. For example, FIG. 1A shows a display item 114 showing the relative values of the assigned variables when the touch input is at the first point 110, and FIG. 1B shows an updated display item 116 showing the relative values of the assigned variables when the touch input is at the second point 112. In this manner, the user is able to simultaneously alter values of multiple variables to obtain a specific scheme for which recommendations can be retrieved or discovered.

It will be appreciated that the assigned variables "rating", "release date" and "genre" in the above example are chosen merely to illustrate one of many different use cases, and the present disclosure is not limited to facilitating the adjustment of those specific variables. In one embodiment of the present disclosure, the method may comprise generating only a single axis, e.g., a first axis, defining a first scale for a first adjustment characteristic, and assigning to the first adjustment characteristic a plurality of first variables stored in memory. For example, the guidance application may be configured to control, based on the variables stored in memory, the operation of other user equipment, such as a lighting system and audio-visual equipment, e.g., that are connected to a (home) network. In one example, a variable "brightness" (relating to the lighting system) and a variable "volume" (relating to the audio-visual equipment) may be assigned to the first adjustment characteristic, such that a single user input, e.g., a touch or gesture input, having a component along the first axis causes each of the variables "brightness" and "volume" to be adjusted at the same time. In this manner, a user is able to control the operation of multiple devices at the same time with a single input. In another example, the guidance application may be configured to control a navigational system, e.g., a "sat-nay" device or a smartphone. For example, a variable "estimated time" and a variable "distance" may be assigned to a first adjustment characteristic, and a variable "route quality=scenic" may be assigned to a second adjustment characteristic. In this manner, a user is a able to simultaneously adjust route parameters, e.g., route total distance, estimated time of arrival and how scenic a route is when searching for a preferred route(s) between points on a map.

Figure 2:
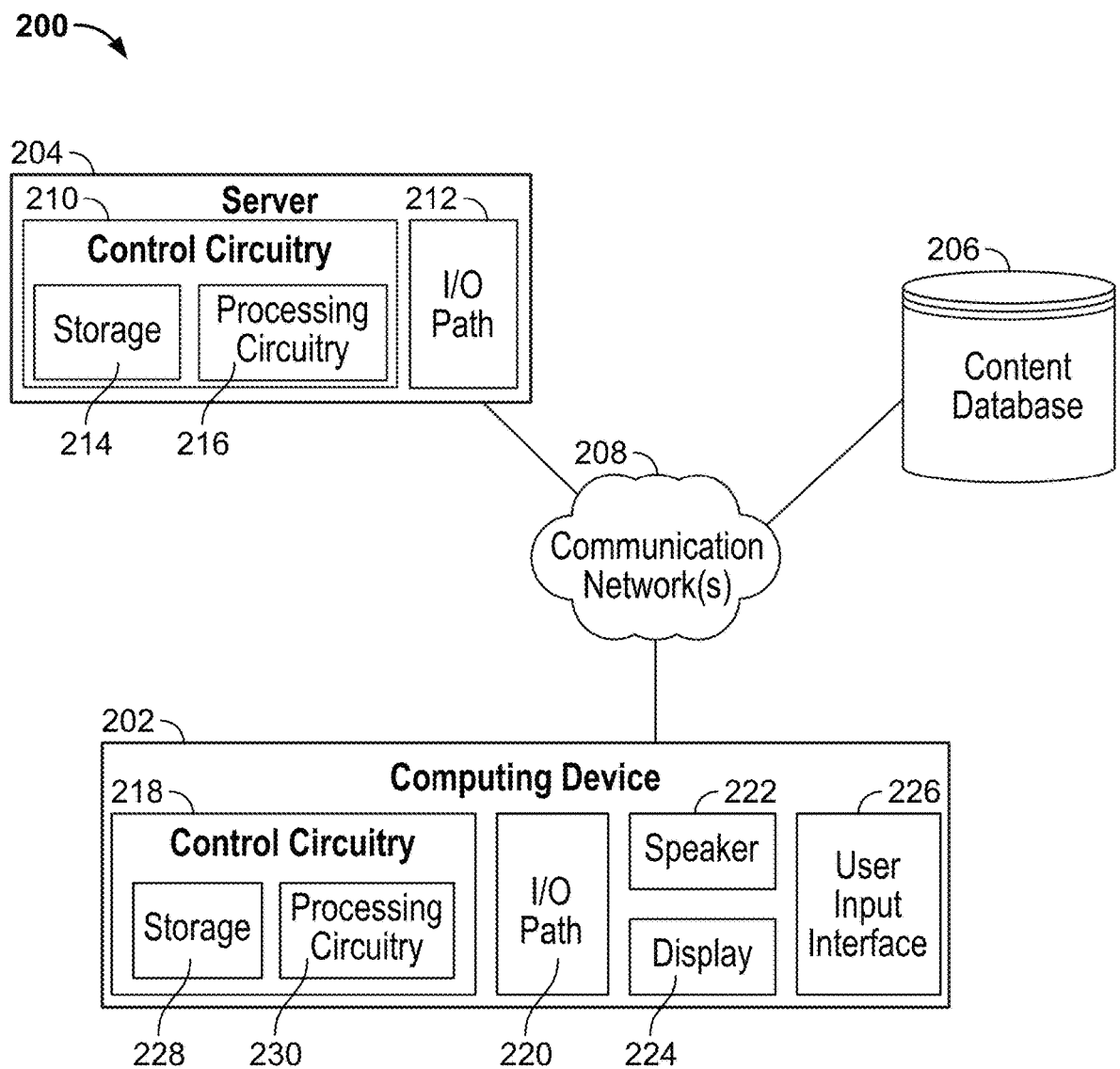
FIG. 2 is a block diagram showing components of an exemplary system for facilitating adjustment of multiple variables via a content guidance application, in accordance with some embodiments of the disclosure.

FIG. 2 is an illustrative block diagram showing additional details of an example of system 200 for facilitating adjustment of multiple variables via a content guidance application, in accordance with some embodiments of the disclosure. Although FIG. 2 shows system 200 as including a number and configuration of individual components, in some embodiments, any number of the components of system 200 may be combined and/or integrated as one device, e.g., user device 100. System 200 includes computing device 202, server 204, and content database 206, each of which is communicatively coupled to communication network 208, which may be the Internet or any other suitable network or group of networks. In some embodiments, system 200 excludes server 204, and functionality that would otherwise be implemented by server 204 is instead implemented by other components of system 200, such as computing device 202. In still other embodiments, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, e.g., touchscreen 102, and user input interface 226, which in some embodiments includes at least one of voice-user interface configured to receive natural language queries uttered by users in proximity to computing device 202; and a touch/gesture interface configured to receive a touch/gesture input, e.g., a swipe. Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some embodiments, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some embodiments, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based embodiments, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

Figure 3:
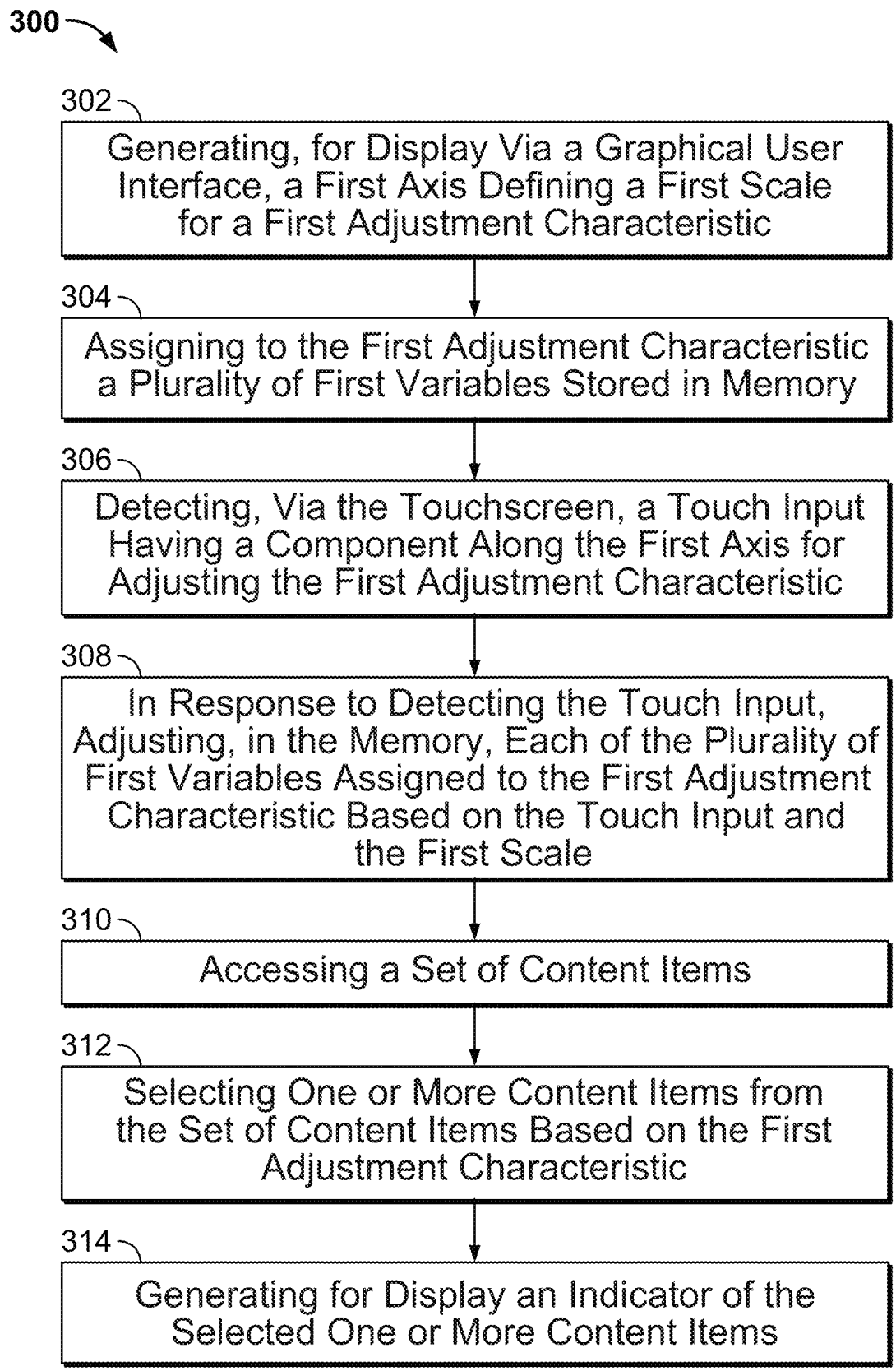
FIG. 3 is a flowchart representing a process for facilitating adjustment of multiple variables via a content guidance application, in accordance with some embodiments of the disclosure.

FIG. 3 is a flowchart representing an illustrative process 300 for facilitating adjustment of multiple variables via a content guidance application, which may be implemented by at least one of user device 100 and system 200, in accordance with some embodiments of the disclosure. At step 302, control circuitry 210 and/or 218 generates, for display via a graphical user interface, e.g., a graphical user interface displayed on touchscreen 102 or display 224, a first axis defining a first scale for a first adjustment characteristic. The method 300 may also comprise a step of generating, for display via the graphical user interface, a second axis defining a second scale for a second adjustment characteristic.

The process 300 comprises step 304 of assigning to the first adjustment characteristic a plurality of first variables stored in memory. For example, step 304 may be performed using control circuitry 210 and/or 218. Process 300 may comprise, e.g., before step 304, receiving a user-selected input for at least one of the plurality of first variables stored in memory, e.g., storage 214, 228. For example, process 300 may comprise receiving a user selection for a first variable, e.g., "rating" relating to a content item (e.g., an aggregate score associated with the content item based on multiple user ratings), and for a second variable, e.g., "number of reviews" relating to a content item (i.e., the number of people that have submitted a review for a content item). Such data relating to a content item may be stored in memory, e.g., storage 214, 228. In such an example, the user's intent might be to discover highly rated content items, e.g., that are stored in content database 206, that have received a high level of critique from reviewers, so that the user can make an informed decision on whether to consume the content item. Additionally or alternatively, process 300 may comprise assigning at least one of the first plurality of variables based on one or more user preferences, stored in the memory, e.g., storage 214, 228. Storage 214 and/or storage 228 may be configured to store a list of variables, e.g., in a database that may be accessed during the assignment of the variables in step 304.

The process 300 may comprise a step of determining or setting the scale for the first adjustment characteristic. For example, the content guidance application may be configured to provide an option for the user to adjust the range of a selected variable, and how the range is mapped onto the first axis. For example, the user may set the range of the "rating" variable to a sub-set of the total range, e.g., to a rating of 5 to 10 out of 10, such that the scale for the first adjustment characteristic on the first axis runs from 5 to 10 in relation to the variable "rating". In a similar manner, the user may set the range of the variable "number of reviews" to a desired numerical range, such that the scale for the first adjustment characteristic on the first axis runs from 50 to 100 in relation to the variable "number of reviews". For example, the user may wish to consider watching only content having a rating above 5 out of 10 and with a high number of reviews, and may wish to discount any lower-rated content or content with a lower number of reviews. In another example, the process 300 may comprise a step of determining or setting the scale for the first adjustment characteristic based on data stored in a user profile, which may be automatically and/or manually updated by the user. For example, a user profile may be stored in memory, such as storage 214, 228, that is accessed whenever a variable is assigned to an adjustment characteristic. The user profile may store one or more user preferences relating to one or more variables, e.g., a preference for content items having a certain actor or group of actors. For example, the user profile may store preferences for rating and release date, so that the user need not set the desired scale each time they assign a variable to an adjustment characteristic.

The process 300 comprises step 306 of detecting an input, e.g., a touch input and/or a gesture input, having a component along the first axis for adjusting the first adjustment characteristic. For example, step 306 may be performed using at least one of control circuitry 218, display 224 (e.g., where display 224 comprises a touchscreen display), and user input interface 226. In some embodiments, where the input is a touch input received at a touchscreen, such as that in the example shown in FIGS. 1A and 1B, the media guidance application may detect that the touch input comprises a first contact point of the touch input, e.g., point 110 shown in FIGS. 1A and 1B, by accessing an application programming interface (API) associated with the touchscreen and retrieving metadata associated with the first contact point. The metadata associated with the first contact point may comprise any data that describes the first contact point, including, for example, a location (such as (x,y) coordinates on the touchscreen), a surface area of the first contact point, and/or a touch pressure of the first contact point. In some embodiments, the API of the touchscreen may also return one or more of the following: a timestamp associated with a start of contact, a timestamp associated with the removal of contact, and/or a duration of contact. For example, the API of the touchscreen may register a "start event" at the time that contact is first detected on the touchscreen, e.g., at point 110 shown in FIGS. 1A and 1B. The API may register an "end event" at a time that contact is removed from the touchscreen, e.g., at point 112 shown in FIGS. 1A and 1B. The API may subtract a timestamp associated with the "end event" from a timestamp associated with the "start event" to determine a duration of the contact. The API may also register a "transition event" between the "start event" and the "end event." In some embodiments, the "transition event" may be registered in response to a movement or a swipe motion of the contact, e.g., movement between points 110 and 112 shown in FIGS. 1A and 1B. The transition event may register any one of the following: a timestamp for the beginning of movement, a timestamp for the end of movement, a distance of the movement, a direction of the movement, a start and/or end point of the movement, a velocity of the movement, and an acceleration of the movement.

In some embodiments, the media guidance application may detect a touch pressure associated with each touch point and adjust the first and/or second adjustment characteristics based on the detected touch pressure, or a change in detected touch pressure, either alone or in combination with a change in a component along the first and/or second axes.

In response to detecting the touch input, the process 300 comprises step 308 of adjusting, in the memory, each of the plurality of first variables assigned to the first adjustment characteristic based on the touch input and the first scale. For example, adjusting each of the plurality of first variables may comprise adjusting, using control circuitry 210 and/or 218, a parameter described or defined by the variable, e.g., a numerical value, alphabetical character associated with the variable, and or a user preference associated with the variable, based on a detected change in position of a contact point of the touch input along the first axis. For example, where the variables "rating" and "number of reviews" have been assigned to the first adjustment characteristic, both of the numerical value for "rating" and the numerical value for "number of reviews" are adjusted simultaneously as the touch input changes the component along the first axis. For example, upon detection of a first contact point, the content guidance application may assign a first value to each of the variables "rating" and "number of reviews" based on the position of the first contact point relative to the first axis (e.g., relative to the origin of the first axis). In response to detecting a change in the touch input, e.g., movement of the contact point along the first axis, the content guidance application may assign a second value, e.g., an updated value, to each of the variables "rating" and "number of reviews" based on the new position of the contact point relative to the first axis (e.g., relative to the origin of the first axis along the first axis). For example, where the first contact point of the touch input is detected at a point at or towards the origin (x=0) of the first axis, and a transition event is registered that moves the contact point of the touch input away from the origin of the first axis along the first axis, control circuitry 210, 218 may cause the numerical value assigned to the variable "rating" to change from "5.5" to "8.5" and the numerical value assigned to the variable "number of reviews" to change from "50" to "100", for example.

The process 300 may comprise a step of generating for display, using control circuitry 210, control circuitry 218, and/or display 224, the relative values of the assigned variables. For example, the display 224 may comprise a display item, such as item 114 and item 116 in the example shown in FIGS. 1A and 1B, that displays the relative values of the assigned variables in response to detecting a change in the touch input. In one example, a display item may be generated at the time that contact is first detected on the touchscreen, the display item displaying the numerical values of the assigned variable that correspond to the position of the first contact point relative to the first axis, e.g., relative to the origin of the first axis along the first axis. In response to detecting a change in the touch input, the display item may be updated, e.g., in real time, as the touch input changes, such that the display item is displaying the numerical values of the assigned variable that correspond to the changed position of the first contact point relative to the first axis, e.g., relative to the origin of the first axis along the first axis. In this manner, the user is able to simultaneously set both of the assigned variables using a single input along a single axis. One benefit of doing so is that separate axes of adjustment are not required for multiple variables, which makes the action of setting or updating a set of search criteria more efficient. Another benefit is that variables that represent similar characteristics may be clustered (i.e., assigned to the same adjustment characteristic) so that they can be adjusted simultaneously.

At step 310, control circuitry 210 and/or 218 accesses a set of content items stored in content database 206, either directly or using communications network 208. Each of the content items may have metadata associated with it describing one or more attributes of the content item, such as its genre, release date, rating, etc., that correspond to the variables stored in memory, e.g., storage 214 and/or 228.

At step 312, control circuitry 210 and/or 218 selects one or more content items based on the first adjustment characteristic. For example, process 300 may comprise matching a content item attribute to a variable assigned to the first adjustment characteristic. Taking the above example of the variables "rating" and "number of reviews" being assigned to the first adjustment characteristic, process 300 may comprise a step of sorting, e.g., filtering, the set of content items according to the respective values of the assigned variables. For example, at the time that contact is first detected on the touchscreen, the values assigned to the variables "rating" and "number of reviews" may be "5.5" and "50" respectively, depending on the position of the touch input relative to the first axis. As such, the set of content items may be categorized into a subset containing those, e.g., only those, content items having a rating equal to or above 5.5 and/or a number of reviews equal to or above 50. In this manner, a set of content items may be sorted into an appropriate subset characterized by multiple variables by virtue of a single user touch input having a directional component along only one axis.

At step 314, the control circuitry 210 and/or 218 causes the display of an indicator of the selected one or more content items, e.g., on display 224. For example, control circuitry 210 and/or 218 may cause a representative description, image and/or clip of the content item to be displayed so that the user can see which content item(s) from the set of content items correspond to the current values of the variables assigned to the first adjustment characteristic. In one example, the indicator may comprise a count of the total number of content items falling into the subset characterized by the current values of the variables assigned to the first adjustment characteristic. Where the values assigned to the variables "rating" and "number of reviews" are "5.5" and "50" respectively, there may be a large subset of content items falling within the set values. As such, and in order to reduce the number of indicators that are displayed to the user, the user may narrow the search criteria by adjusting the values assigned to the variables "rating" and "number of reviews" to "8.5" and "70" respectively, by virtue of adjusting the position of the touch input along the first axis. In this manner, the user may quickly access a set of search results for content items, and subsequently modify the returned set of results using a single touch input.

The actions or descriptions of FIG. 3 may be used with any other embodiment of this disclosure. In addition, the actions and descriptions described in relation to FIG. 3 may be done in any suitable alternative orders or in parallel to further the purposes of this disclosure.

It will be understood that the above example is intended to demonstrate how the present disclosure enables the simplified return and modification of search results characterized by multiple variables, and in no way is intended to limit the disclosure to the example given. Indeed, with a growing volume of content items available to a user, there is a need for a user to be able to navigate a large amount of content by modifying results for recommended content items, for example depending on their mood, their viewing environment, or some other condition, without performing multiple searches and navigating forwards and backwards through a series of menus to adjust the parameters for search criteria. As such, the present disclosure provides a method for facilitating adjustment of multiple parameters when searching for recommended content by virtue of a single touch input comprising multiple contact points. For example, FIG. 4 illustrates an exemplary system and method for facilitating adjustment of multiple variables that characterize a search using a finger and thumb touch input in a similar manner as the above examples using a touch input having a single contact point.

Figure 4:
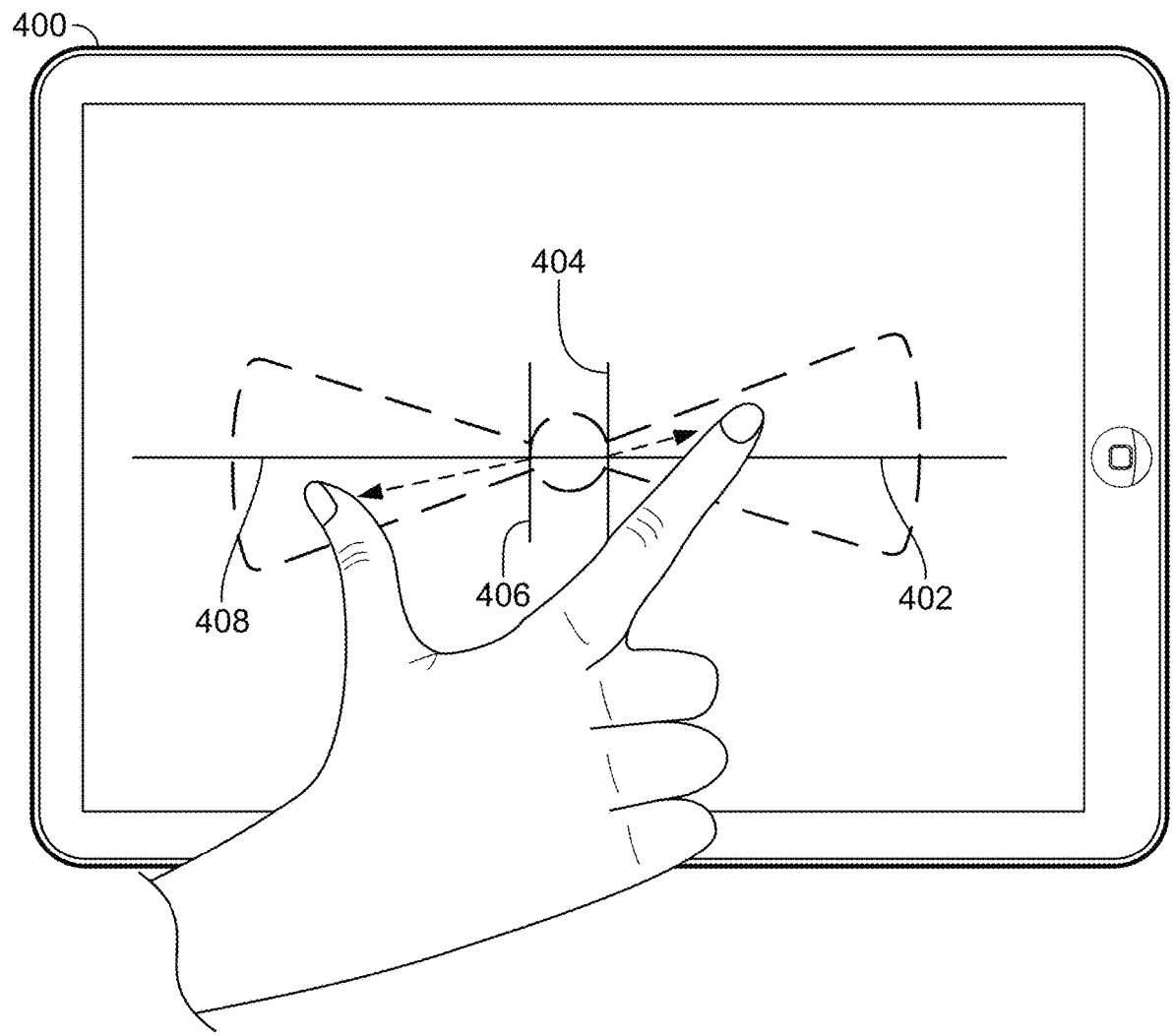
FIG. 4 illustrates an exemplary system and method for facilitating adjustment of multiple variables via a content guidance application, in accordance with some embodiments of the disclosure.

In the example shown in FIG. 4, two pairs of axes have been generated, on a touchscreen of a user device 400, in a back-to-back arrangement of a Cartesian coordinate plane (e.g., +x, −x, +y, −y), each of the axes defining a scale for respective adjustment characteristics. For example, FIG. 4 shows an arrangement with a first pair of axes comprising a first axis 402 and a second axis 404, and a second pair of axes comprising a third axis 406 and a fourth axis 408. Each of the pairs of axes are generated and set out in a similar manner to that illustrated in FIGS. 1A and 1B. Advantageously, the example shown in FIG. 4 allows for the simultaneous adjustment of many, e.g., 6 to 8 variables, or more, using a single touch input. For example, the first and second adjustment characteristics may be assigned variables in a manner similar to that described for the example shown in FIGS. 1A and 1B, e.g., the first adjustment characteristic of the first axis 402 may be assigned the variable "rating" and the variable "release date", and the second adjustment characteristic may be assigned the broad variable "genre". Given such a set-up, the user is able to quickly search for recommendations by adjusting the three variables simultaneously, e.g., by scrolling through different genres and refining recommendations by rating and release date. However, given the plethora of content now available from online streaming services, narrowing searches using these three variables, for example, may not be enough to provide the user with relevant recommendations. Thus, use of the third and/or fourth axes 406, 408 in combination with the first and second axes 402, 404 provide the user with the ability to control many different parameters at once when searching for recommended content. For example, in addition to the variables assigned to the first and second adjustment characteristics, the user may assign the variable "preferred actor (male)" and the variable "preferred actor (female)" to a third adjustment characteristic of the third axis 406, and the variable "preferred director" to a fourth adjustment characteristic of the fourth axis 408. Each of the variables "preferred actor (male)", "preferred actor (female)" and "preferred director" may be based upon one or more user preferences stored in memory.

The example shown in FIG. 4 gives the user the ability to search for recommended content items with great efficiency. For example, the user need only assign the desired variables to respective adjustment characteristics during the setup of the content guidance application, which enables the user to narrow search results in multiple ways using any one of, or any combination of, the adjustment characteristics, e.g., each time they use the content guidance application.

Figure 5:
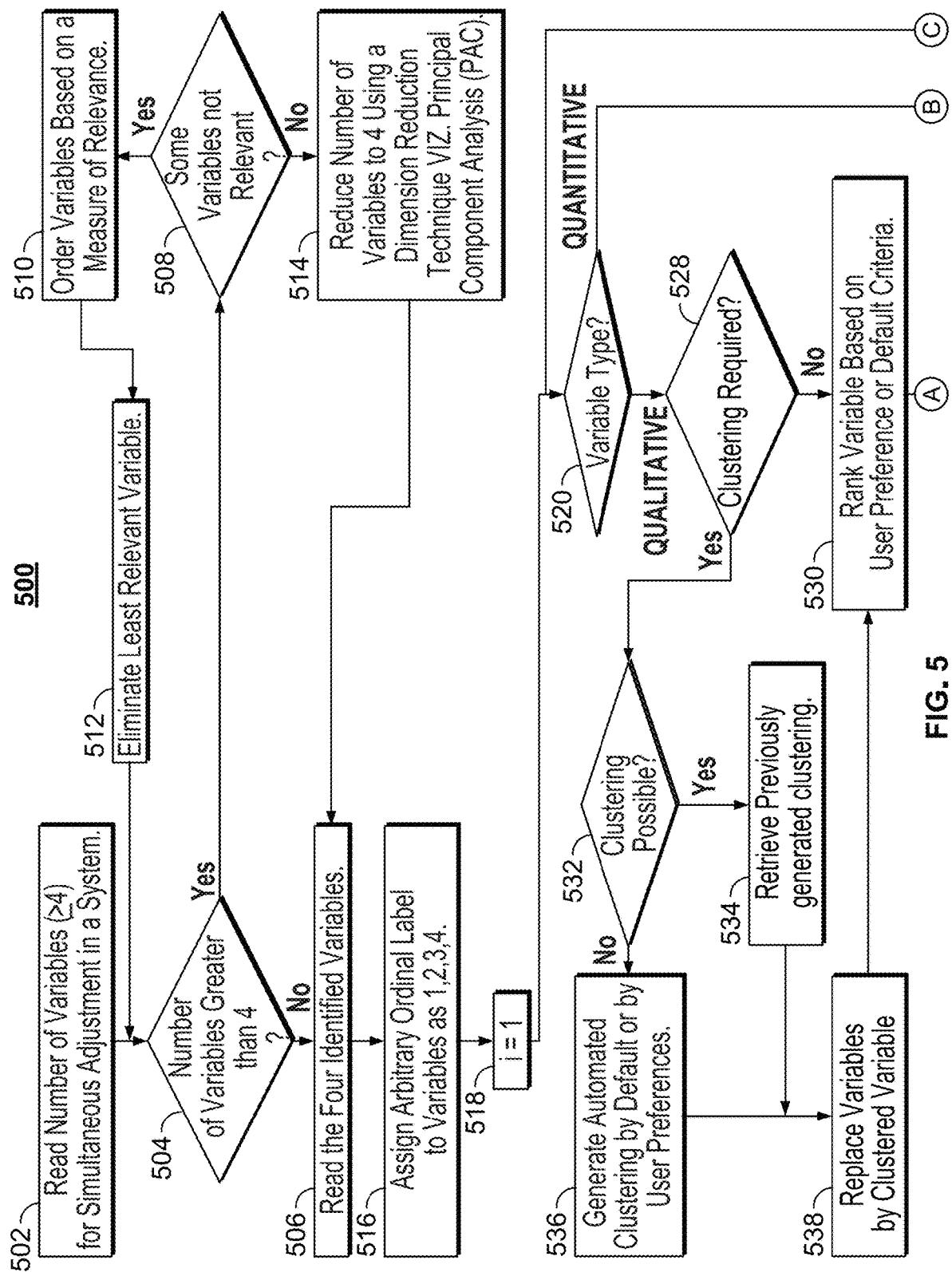
FIG. 5 is a flowchart representing a process for facilitating adjustment of multiple variables via a content guidance application and retrieving recommendations corresponding to the adjusted multiple variables, in accordance with some embodiments of the disclosure.
Figure 5:
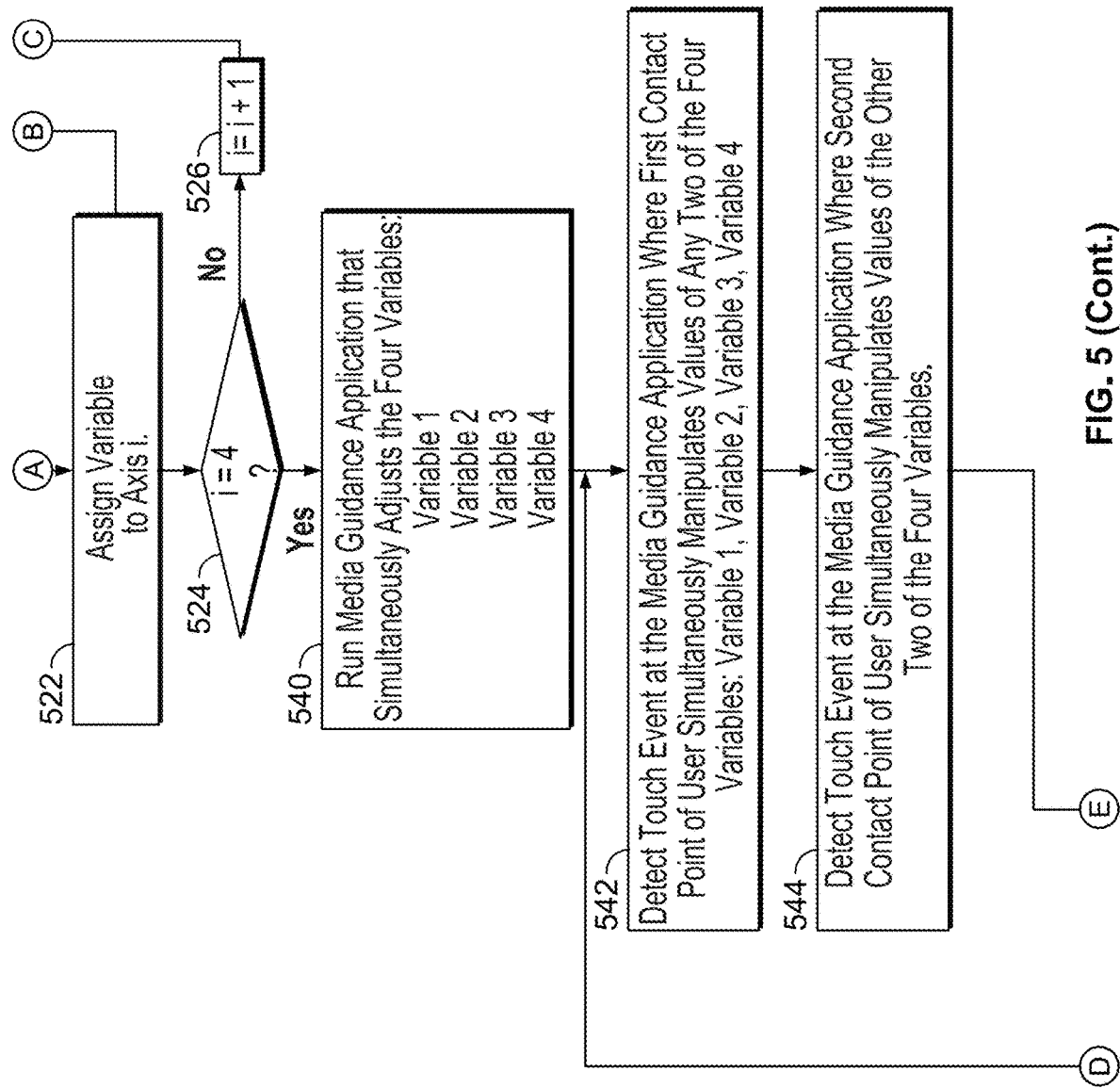
Figure 5:
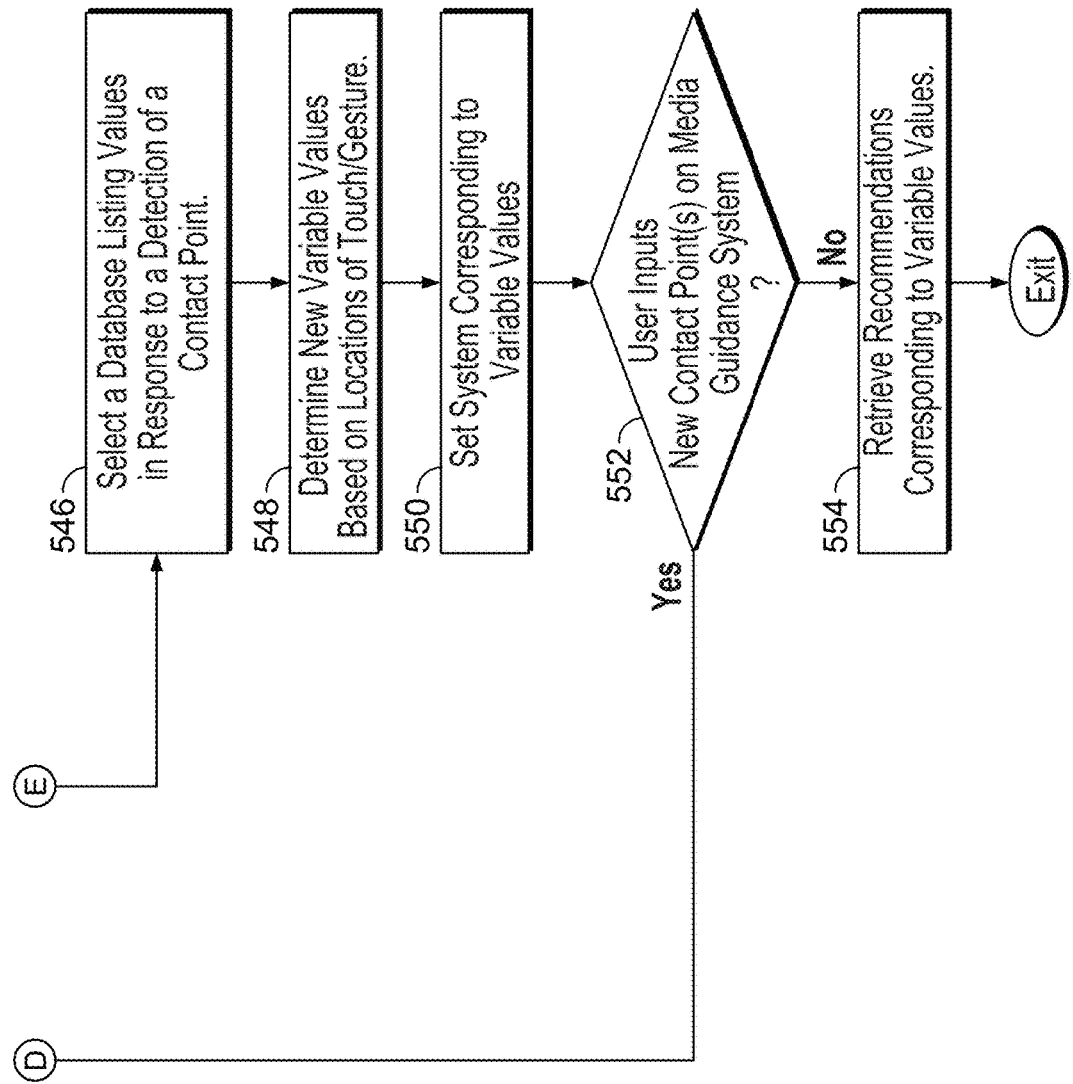

FIG. 5 is a flowchart representing an illustrative process 500 for facilitating adjustment of multiple variables via a content guidance application, which may be implemented by at least one of user device 100, 400 and system 200, in accordance with some embodiments of the disclosure.

At step 502, the number of variables selected by a user (and/or automatically selected by the system 200, e.g., depending on user metadata and/or one or more user preferences) for simultaneous adjustment is read. Step 502 may be referred to a variable counting step. Using the example shown in FIG. 4, the number of selected variables is 6: "rating", "release date", "genre", "preferred actor (male)", "preferred actor (female)", and "preferred director".

At step 504, it is determined if the number of variables is greater than a predetermined number, e.g., 4. In this example, the number 4 is used since it corresponds to the number of axes, e.g., axes 402, 404, 406 and 408. However, in another example, the predetermined number may be any appropriate number, which may correspond to the number of axes (or dimensions) in which the user wishes to control the search criteria. Where the number of variables is not greater than the predetermined number, process 500 continues to step 506, at which the identified variables are read, i.e., the identity of each of the read variables is determined. Where the number of variables is greater than the predetermined number, process 500 continues to step 508, at which the relevance of the variables is determined. For example, one or more of the selected variables may not relate to the context of searching for recommended media content, e.g., one or more of the variables may relate to controlling the operation of user equipment devices, such as the volume of audio equipment, and thus may be irrelevant in process 500. Where it is determined that one or more of the variables may not be relevant, process 500 moves to step 510, at which the variables are ordered based on a measure of their relevance, e.g., using metadata stored in memory that describes the variable and the search context(s) that it relates to. At step 512, the least relevant variable is eliminated from the set of selected variables, and process 500 returns to step 504, where it is again determined if the number of variables is greater than the predetermined number.

Returning to step 508, where it is determined that all of the variables are relevant, which is the case in the present example, process 500 moves to step 514, where the number of variables are reduced to the predetermined number, e.g., 4, using a dimension reduction technique, such as principal component analysis (PCA), and/or any other suitable technique. For example, the variables "preferred actor (male)" and "preferred actor (female)" may be reduced to a single dimension, since they are each a subset of a broader variable "preferred actor", and the variables "rating" and "release date" may be reduced to a single dimension, since they are both quantitative variables and may be represented by a numerical value. However, the variables may be reduced dimensionally based on any suitable criteria. Upon reducing the number of variables to the predetermined number, process 500 continues to step 506, at which the identified variables are read, i.e., the identity of each of the read variables is determined.

At step 516, an ordinal label "i" is assigned, e.g., arbitrarily, to the variables. For example, after the dimensional reduction of step 514, the dimensionally reduced variable "rating-release date" may be assigned the ordinal label "i=1", the variable "genre" may be assigned the ordinal label "i=2", the variables "preferred actor (male)" and "preferred actor (female)" may be assigned the ordinal label "i=3", and the variable "preferred director" may be assigned the ordinal label "i=4". However, the variables may be assigned any appropriate ordinal label. At step 518, the first ordinal label "i=1" is selected.

At step 520, it is determined if the selected ordinal label represents a quantitative variable or a qualitative variable. Where it is determined that the selected ordinal label represents a quantitative variable, which is the case for "i=1", process 500 moves to step 522, where the variable is assigned to an axis, e.g., axis 402, defining a first scale for a first adjustment characteristic. In this example, the ordinal label "i=1" is assigned to axis 402, which defines a numerical scale for the first adjustment characteristic, which represents both the variables "rating" and "release date", e.g., the dimensionally reduced variable "rating-release date".

At step 524, it is determined if the selected ordinal number "i=1" equals the final ordinal label, which in this case is "i=4". At step 526, the ordinal label is increased by "i+1", and the process returns to step 520, which determines if the next ordinal label "i=2" represents a quantitative variable or a qualitative variable. In the present example, the ordinal label "i=2" represents the variable "genre", which is a qualitative variable, and so the process moves to step 528.

At step 528, it is determined if the ordinal label "i=2" requires clustering. In this example, ordinal label "i=2" represents a single variable, "genre", and thus does not require clustering, and the process moves to step 530.

At step 530, the variable "genre" is ranked or ordered based on default criteria and/or one or more user preferences. For example, the variable "genre" may be ordered alphabetically, or may be ranked based on one or more user preferences for preferred or non-preferred genres, e.g., a preferred genre may receive a higher ranking and a non-preferred genre may receive a lower ranking In one example, a user preference might be for an alphabetical ordering. The process moves on to step 522, where the ranked/ordered variable "genre" is assigned to an axis, e.g., axis 404, defining a second scale for a second adjustment characteristic. In this example, the ordinal label "i=2" is assigned to axis 404, which defines an alphabetical scale for the second adjustment characteristic, which represents the different genres listed in alphabetical order.

Process 500 then moves on to steps 524 and 526, and returns to step 520, which determines if the next ordinal label represents a quantitative variable or a qualitative variable. In this case, the next ordinal label is "i=3", which represents the qualitative variables "preferred actor (male)" and "preferred actor (female)". At step 528, it is determined that the ordinal label represents multiple variables, and, as such, requires clustering.

Process 500 moves to step 532, which determines if the multiple variables are already clustered, have been clustered previously, and/or can be clustered, e.g., according to an existing rule, user preference or (default) setting. Where the multiple variables can be clustered, process 500 moves to step 534, where previously generated clustering is retrieved and applied to the variables. For example, a previously generated clustering for the variables "preferred actor (male)" and "preferred actor (female)" may be stored in memory, wherein the previously generated clustering defines a rule to combine the variables and expand them into a broader variable "preferred actor", or a rule to combine the variables and weight one of the variables higher than the other. For example, the variable "preferred actor (male)" may receive a weighting half that as for the variable "preferred actor (female)", since one or more user preferences and/or settings indicate that the user is more interested in watching movies with female lead roles, as opposed to male lead roles. Where it is determined that no previously applied rule can be used to cluster the variables, process 500 moves to step 536, which generates a new rule or setting, e.g., automatically using one or more user preferences, manually, e.g., by requesting input from the user, and/or using one or more (default) settings stored in memory. At step 538, the separate variables "preferred actor (male)" and "preferred actor (female)" are replaced by the clustered variable "preferred actor (male)-preferred actor (female)", and the process moves on to step 530, where the (clustered) variable is ranked or ordered in a similar manner to that described in the example shown in FIGS. 1 and 2 for the variable "genre=romantic comedy", i.e., the clustered variable is ranked and ordered by how well the clustered variable "preferred actor (male)-preferred actor (female)" matches user preferences for preferred and non-preferred male and female actors.

The process moves on to step 522, where the ranked/ordered variable "preferred actor (male)-preferred actor (female)" is assigned to an axis, e.g., axis 406, defining a third scale for a third adjustment characteristic. In this example, the ordinal label "i=3" is assigned to axis 406, which defines a scale defined by one or more user preferences for the third adjustment characteristic, which represents the variables "preferred actor (male)-preferred actor (female)".

Process 500 then repeats steps 524, 526, 520, 528 and 530 in respect of the last ordinal label "i=4", which represents the variable "preferred director". At step 522, the ranked/ordered variable "preferred director" is assigned to an axis, e.g., axis 408, defining a fourth scale for a fourth adjustment characteristic. In this example, the ordinal label "i=4" is assigned to axis 408, which defines a scale defined by one or more user preferences for the fourth adjustment characteristic, which apply to the variable "preferred director".

At step 524, process 500 determines that the ordinal label "i=4" equals the predetermined number and moves on to step 540.

At step 540, the media content guidance application is configured to simultaneously adjust each of the variables assigned to the first to fourth adjustment characteristics, as set out above. At this stage in process 500, the content guidance application is set up to receive one or more user touch inputs.

At step 542, a touch input, e.g., comprising a first touch event having a contact point relating to the contact point of the finger in the example shown in FIG. 4, is detected having a component along the first axis 402 for adjusting the variable assigned to the first adjustment characteristic and a component along the second axis 404 for adjusting the variable assigned to the second adjustment characteristic. However, the first touch event may result in the simultaneous adjustment of any two of the four variables depending on which variables have been assigned to which ordinal labels at step 516.

At step 544, a second touch event of the touch input, e.g., a second touch event having a contact point relating to the contact point of the thumb in the example shown in FIG. 4, is detected having a component along the third axis 406 for adjusting the variable assigned to the third adjustment characteristic and a component along the fourth axis 408 for adjusting the variable assigned to the fourth adjustment characteristic.

At step 546, a database is accessed listing the values associated with each variable upon detection of at least one touch event of the touch input, e.g., depending on the position of the contact point(s) of the touch input. In the example shown in FIG. 4, the values associated with the first and second variables correspond to the position of the first contact point of the touch input (finger) in relation to the first and second axes respectively, and the values associated with the third and fourth variables correspond to the position of the second contact point of the touch input (thumb) in relation to the third and fourth axes respectively. In the context of the present disclosure, the term "value" is to be interpreted broadly in relation to a variable, and is intended to include a numerical value, e.g., a date, or a rating, and a non-numerical value, e.g., a lexical value, where the variable describes a set of actors. For example, a non-numerical value may be a letter or a word. An example of the display of the values associated with variables is shown in FIG. 1A (see display item 114).

At step 548, new variable values are determined based on modified positions of the first and second contact points of the touch input, e.g., as a user moves their finger and thumb relative to the axes. An example of the display of updated values associated with the variables as a result of movement of the user's touch input is shown in FIG. 1B (see display item 116).

At step 550, the system sets the values of the variables, e.g., to be used as the parameters for a search for recommended content. The values may be set upon determination that the touch input has ended, e.g., when the user removes their finger and thumb from the user device 400. Using the example shown in FIG. 4, the first variable may be set to "rating=5.5, release date>1995", "genre=action", "preferred actor (male)-preferred actor (female)=90%" and "preferred director=0%". In this case, the user's current interest is in older action movies having an above-average rating with well-preferred actors. However, in this case, the user is not interested in who directed the movie. User preferences may indicate that Brad Pitt is a preferred male actor, and Angelina Jolie is a preferred female actor.

At step 552, it is determined whether a further touch input is received, for example if the user wishes to further adjust the set values of the variables. Where a further touch input is received, process 500 repeats steps 542, 544, 546, 548 and 550. Where no further touch input is received, e.g., within a predetermined period, such as 1 second, or 5 seconds, process 500 concludes at step 554 by retrieving recommendations for content items corresponding to the values set at step 550. Continuing with the above example, a list of recommended content items may include, but not be limited to, the movies: "Lara Croft: Tomb Raider" (release date=2001, rating=5.8/10, genre=action/adventure, female actor=Angelina Jolie, director=Simon West); "Fight Club" (release date=1999, rating=8.8/10, genre=action/thriller, male actor=Brad Pitt, director=David Fincher); "Mr. & Mrs. Smith" (release date=2005, rating=6.5/10, genre=action/comedy, male actor=Brad Pitt, female actor=Angelina Jolie, director=Doug Liman).

The actions or descriptions of FIGS. 4 and 5 may be used with any other embodiment of this disclosure. In addition, the actions and descriptions described in relation to FIGS. 4 and 5 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating, for display via a graphical user interface, a first axis defining a first scale for a first adjustment characteristic;
   assigning a plurality of first variables stored in memory to the first adjustment characteristic, wherein the plurality of first variables correspond to quantitative variables of content items of a set of content items, and wherein each of the plurality of first variables is independent and corresponds to a different quantitative characteristic of the content items of the set of content items;
   receiving an input of a position having a component along the first axis for adjusting the first adjustment characteristic; and
   in response to receiving the input:
      adjusting the plurality of first variables assigned to the first adjustment characteristic based on the input and the first scale, wherein each variable of the plurality of first variables is adjusted independently; and
      generating for display, the content items based on the adjusted plurality of first variables.

2. The method of claim 1, further comprising:
   generating, for display via the graphical user interface, a second axis defining a second scale for a second adjustment characteristic;
   assigning at least one second variable stored in memory to the second adjustment characteristic;
   in response to receiving the input, determining that the input also has a component along the second axis, and adjusting the at least one second variable assigned to the second adjustment characteristic.

3. The method of claim 2, further comprising automatically assigning variables to the second adjustment characteristic based on the assignment of at least one of the plurality of first variables to the first adjustment characteristic.

4. The method of claim 1, wherein adjusting the plurality of first variables comprises adjusting at least one of: a numerical value, alphabetical character associated with the variable, or a user preference associated with the variable.

5. The method of claim 1, further comprising displaying an option to adjust a scale of at least one of the plurality of first variables.

6. The method of claim 1, further comprising displaying relative values of the assigned plurality of first variables corresponding to received input.

7. The method of claim 6, wherein the displaying relative values of the assigned plurality of first variables is updated in real time as the input changes.

8. The method of claim 1, further comprising clustering variables that represent similar characteristics.

9. The method of claim 1, further comprising:
determining the plurality of first variables is greater than a predetermined number;
determining a relevance of the plurality of first variables;
ordering the plurality of first variables, using metadata stored in memory that describes the plurality of first variables and a search context that it relates to, based on their relevance; and
eliminating a variable determined to be least relevant based on the ordering from the plurality of first variables.

10. The method of claim 1, further comprising setting the first adjustment characteristic to a minimum threshold based on detecting the input.

11. A system comprising:
a memory;
a graphical user interface; and
control circuitry configured to:
generate, for display via the graphical user interface, a first axis defining a first scale for a first adjustment characteristic;
assign a plurality of first variables stored in memory to the first adjustment characteristic, wherein the plurality of first variables correspond to quantitative variables of content items of a set of content items, and wherein each of the plurality of first variables is independent corresponds to a different quantitative characteristic of the content items of the set of content items;
receive an input of a position having a component along the first axis for adjusting the first adjustment characteristic; and
in response to receiving the input:
adjust the plurality of first variables assigned to the first adjustment characteristic based on the input and the first scale, wherein each variable of the plurality of first variables is adjusted independently; and
generate for display, the content items based on the adjusted plurality of first variables.

12. The system of claim 11, wherein the control circuitry is further configured to:
generate, for display via the graphical user interface, a second axis defining a second scale for a second adjustment characteristic;
assign at least one second variable stored in memory to the second adjustment characteristic;
in response to receiving the input, determine that the input also has a component along the second axis, and
adjust the at least one second variable assigned to the second adjustment characteristic.

13. The system of claim 12, wherein the control circuitry is further configured to automatically assign variables to the second adjustment characteristic based on the assignment of at least one of the plurality of first variables to the first adjustment characteristic.

14. The system of claim 11, wherein adjusting the plurality of first variables comprises adjusting at least one of: a numerical value, alphabetical character associated with the variable, or a user preference associated with the variable.

15. The system of claim 11, wherein the control circuitry is further configured to display an option to adjust a scale of at least one of the plurality of first variables.

16. The system of claim 11, wherein the control circuitry is further configured to display relative values of the assigned plurality of first variables corresponding to received input.

17. The system of claim 16, wherein the displayed relative values of the assigned plurality of first variables are updated in real time as the input changes.

18. The system of claim 11, wherein the control circuitry is further configured to cluster variables that represent similar characteristics.

19. The system of claim 11, wherein the control circuitry is further configured to:
determine the plurality of first variables is greater than a predetermined number;
determine a relevance of the plurality of first variables;
order the plurality of first variables, using metadata stored in memory that describes the plurality of first variables and a search context that it relates to, based on their relevance; and
eliminate a variable determined to be least relevant based on the ordering from the plurality of first variables.

20. The system of claim 11, wherein the control circuitry is further configured to set the first adjustment characteristic to a minimum threshold based on detecting the input.

\* \* \* \* \*